US008563862B2

(12) United States Patent
Mochizuki

(10) Patent No.: US 8,563,862 B2
(45) Date of Patent: Oct. 22, 2013

(54) BUS BAR

(75) Inventor: Takahiro Mochizuki, Makinohara (JP)

(73) Assignee: Yazaki Corporation, Tokyo (JP)

( * ) Notice: Subject to any disclaimer, the term of this patent is extended or adjusted under 35 U.S.C. 154(b) by 60 days.

(21) Appl. No.: 13/299,803

(22) Filed: Nov. 18, 2011

(65) Prior Publication Data

US 2012/0298418 A1 Nov. 29, 2012

(30) Foreign Application Priority Data

Nov. 25, 2010 (JP) ................................ 2010-262302

(51) Int. Cl.
*H02G 3/06* (2006.01)

(52) U.S. Cl.
USPC ......................... 174/84 C; 174/68.2; 439/723

(58) Field of Classification Search
USPC ........ 174/68.2, 84 C; 439/723, 751, 76.2, 75, 439/621, 949
See application file for complete search history.

(56) References Cited

U.S. PATENT DOCUMENTS 7,033,186 B2 * 4/2006 Kawakita et al. ............ 439/76.2

FOREIGN PATENT DOCUMENTS

JP 2005-019259 A 1/2005

* cited by examiner

*Primary Examiner* — Dhirubhai R Patel
(74) *Attorney, Agent, or Firm* — Edwards Wildman Palmer LLP; James E. Armstrong, IV; Carolina E. Save

(57) ABSTRACT

The present invention relates to a bus bar having a plate-shaped main body, a wire connection projecting from the edge of one end of the main body, a tuning fork shaped first terminal projecting from the edge of the other end thereof and including a groove in which a terminal of electronic components is pressed, second terminal projecting from the edge, and third terminal projecting from the edge. The second and third terminals are arranged so that the first terminal is positioned between the second and third terminals. The second terminal projects from the main body longer than the first terminal, and the third terminal projects from the main body shorter than the first terminal. Further, the tip of the first terminal is positioned on the inside of a virtual starlight line P connecting the tip of the second terminal with the tip of the third terminal.

2 Claims, 6 Drawing Sheets

BUS BAR

CROSS REFERENCE TO RELATED APPLICATION

The priority application Number Japan Patent Application No. 2010-262302 upon which this patent application is based is hereby incorporated by reference.

TECHNICAL FIELD

The present invention relates to a bus bar having a wire connection in which an electric wire is fixed and connected by applying pressure and a terminal formed into a tuning fork shape.

BACKGROUND OF THE INVENTION

Previously, in an electric junction box for vehicle, a bus bar formed by pressing a metallic plate is used. FIG. 6 is a plane view showing a conventional bus bar. FIG. 7 is plane view showing the other conventional bus bar in Japanese Patent Application 2005-19259.

A bus bar 210 shown in FIG. 6 has a plate-shaped main body 211, a wire connection 214 projecting from an edge 211*a* of one end of the main body, a terminal 215 projecting from an edge 211*b* of the other end of the main body, and a pair of plates 216 for preventing deformation of the terminal. The plates 216 project from both ends of the edge 211*b*.

The wire connection 214 has a pair of core wire crimping pieces 212 crimping a core wire 271 of an electric wire 207, and a pair of insulating coating crimping pieces 213 crimping a insulating coating 272 of the electric wire 207.

The terminal 215 is formed into a tuning fork shaped, and includes a groove 215*a* in which a terminal of electric components such as a fuse is pressed.

The plates 216 are respectively formed into a rectangular shape, and arranged so that a plurality of terminals 215 are located between the plates 216. Furthermore, the plates 216 project from the main body 211 longer than the terminals 215.

In the above bus bar 210, the plates 216 project from the main body 211 longer than terminals 215. Even if the bus bar 210 is dropped on the ground or is hit against a wall while the bus bar 210 is received in a housing of an electric junction box, a tip of the terminal 215 can be prevented from hitting against a wall, and the terminal 215 can be protected.

A bus bar 210' shown in FIG. 7 adds another plate 216 between the plates of the bus bar 210 shown in FIG. 6. The tip of the terminal 215 of the bus bar 210' can be prevented from hitting object having a width smaller than space between the plates 216.

However, there is a problem in the conventional bus bars 210, 210' as described below. More specifically, the plates 216 of the conventional bus bars 210, 210' are provided so as to protect only the terminal 215. As a result, there is a problem such that the weight of the plates 216 and the material costs thereof rise. Furthermore, since the plate 216 is provided, the size of the electric junction box is increased.

Accordingly, an object of the present invention is to provide a bus bar which can protect a terminal formed into a tuning fork shape and can reduce the weight and material costs.

SUMMARY OF THE INVENTION

In order to attain the above object, the present invention provides a bus bar formed by pressing a metallic plate which includes a plate-shaped main body, a wire connection projecting from an edge of one end of the main body and connecting an electric wire by applying pressure, a tuning fork shaped first terminal projecting from an edge of the other end of the main body and including a groove in which a terminal of electronic component is pressed, a bar-shaped second terminal projecting from the edge of the other end of the main body, and a bar-shaped third terminal projecting from the edge of the other end of the main body. The second terminal and the third terminal are arranged so that the first terminal is positioned between the second terminal and the third terminal. One of the second terminal and the third terminal projects from the main body longer than the first terminal, and the other projects from the main body shorter than the first terminal. Further, the tip of the first terminal is positioned on the inside of a virtual straight line connecting the tip of the second terminal with the tip of the third terminal.

Furthermore, a pair of the others of the second terminal and the third terminal are provided, and the one of the second terminal and the third terminal is arranged between the pair of the others. The first terminals are respectively arranged between one of the pair of the others and the one of the second terminal and the third terminal, and between the other of the pair of the others and the one of the second terminal and the third terminal.

According to the present invention, when the bus bar of the present invention falls to the ground or hits against a wall before the bus bar is received in a housing of an electric junction box, the tip of the first terminal can be prevented from hitting against a wall by the second terminal and the third terminal. Further, the first terminal can be protected by the second terminal and the third terminal. Furthermore, the second terminal and the third terminal are not only exclusive parts for protecting the first terminal but also parts for electrically connecting electronic component. Therefore, although protective function of the first terminal is added to the bus bar, the weight of the bus bar of the present invention and material cost thereof can be reduced.

According to the present invention, the tip of the first terminal of the bus bar can be prevented from hitting object having a width smaller than space between the pair of the others.

The above and other objects and features of this invention will become more apparent from the following description taken in conjunction with the accompanying drawings.

DESCRIPTION OF THE PREFERRED EMBODIMENT

[First Embodiment]

Figure 1:
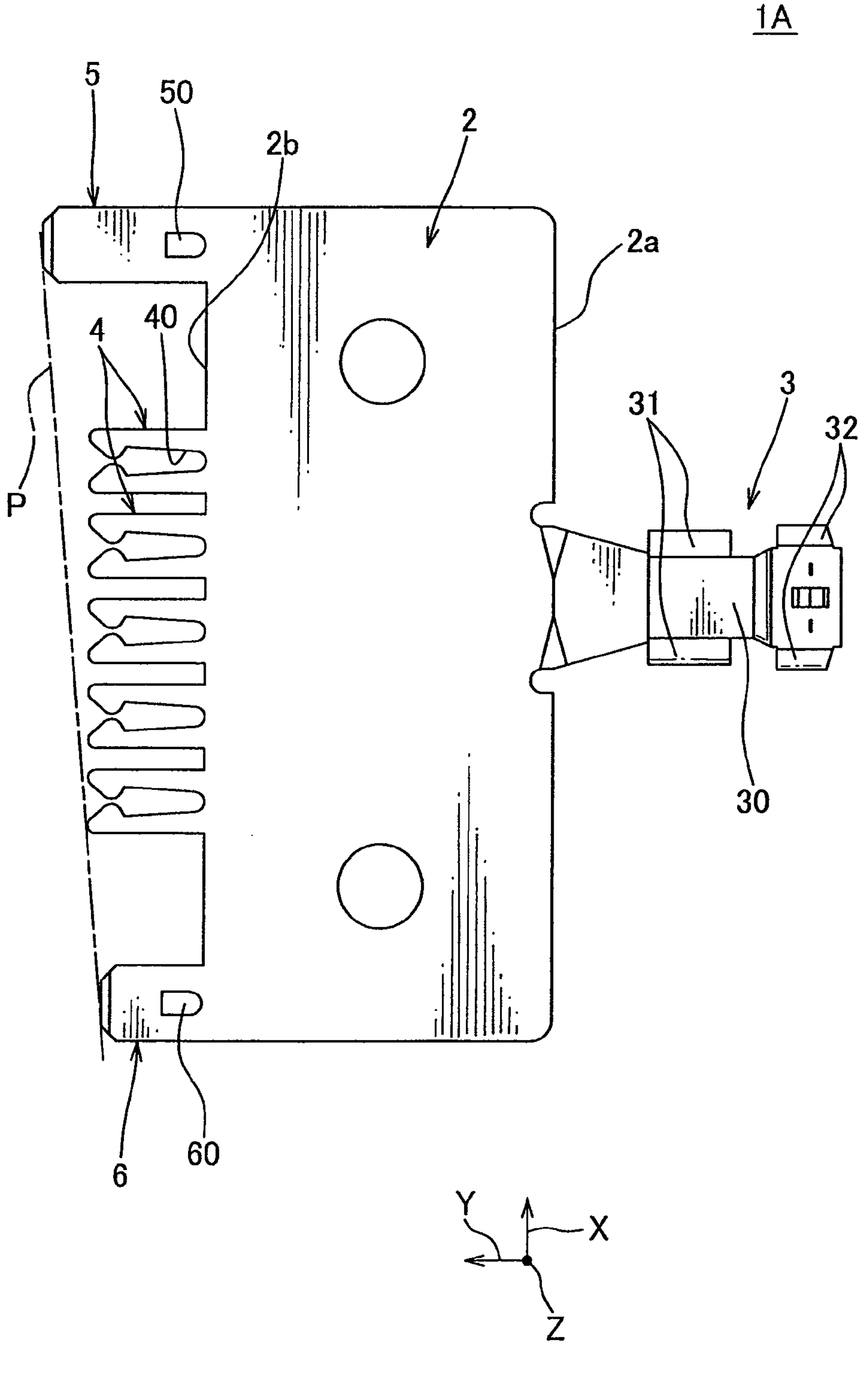
FIG. 1 is a plane view showing a bus bar in first embodiment of the present invention.
Figure 2:
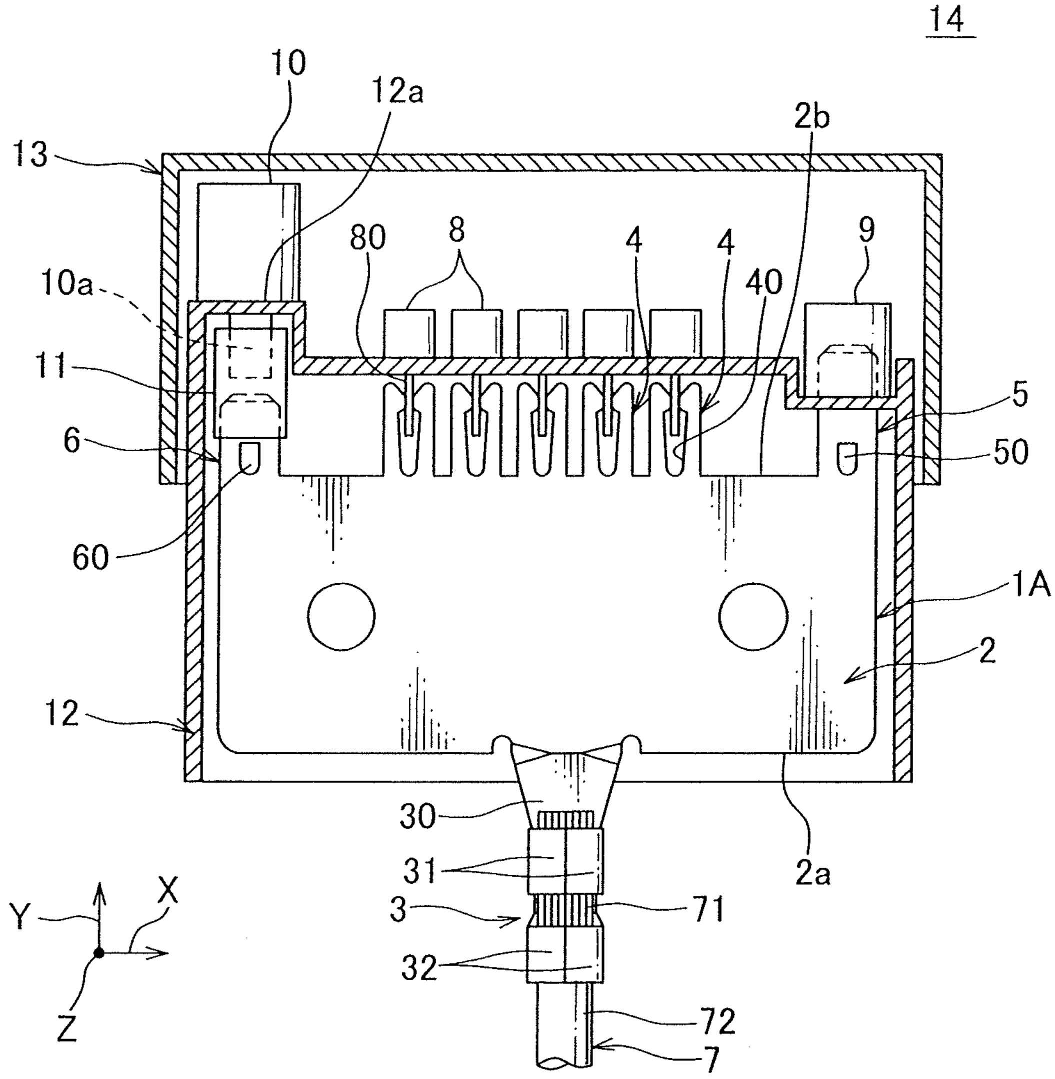
FIG. 2 is a schematic view showing schematic of an electronic junction box having the bus bar shown in FIG. 1.

A bus bar according to first embodiment of the present invention will be explained with reference to FIGS. 1 and 2. The bus bar 1A of the present invention shown in FIG. 1 is formed by pressing a metallic plate, and as shown in FIG. 2 is arranged in an automotive electric junction box 14. The electric junction box 14 is attached to an engine room of a vehicle, supplies electric power to various electric equipments mounted on the vehicle, and transmits signal to various electric equipments. Incidentally, in this description, a junction block (junction box), a fuse block (fuse box) and a relay block (relay box) are collectively called "electric junction box" hereafter.

The bus bar 1A has a main body 2 formed into a rectangular plate shape, a wire connection 3 projecting from the edge 2*a* of one side of the main body 2 and connecting an electric wire 7 by applying pressure, a plurality of first terminals 4 formed into a tuning fork shape and projecting the edge 2*b* of the other side of the main body 2, a bar-shaped second terminal 5 projecting the edge 2*b* of the other side of the main body 2, and a bar-shaped third terminal 6 and projecting the edge 2*b* of the other side of the main body 2

An arrow X in FIGS. 1 and 2 shows a longitudinal direction of the main body 2, an arrow Y shows a width direction of the main body 2, and an arrow Z shows a thickness direction of the main body 2.

The wire connection 3 has a bottom wall 30 positioning the electric wire 7 on the surface, a pair of core wire crimping pieces 31 extending from the bottom wall 30 and attaching the core wire 71 of the electric wire 7 by pressure, and a pair of insulating coating crimping pieces 32 extending form the bottom wall 30 and attaching the insulating coating 72 of the electric wire 7 by pressure. The electric wire 7 is power wire.

The first terminal 4 is formed into a tuning fork shape including a groove 40 in which a terminal 80 of a fuse 8 as electronic components is pressed. The groove 40 extends from a tip of the first terminal 4 toward the edge 2*b*. The first terminals 4 are arranged along the longitudinal direction X of the main body 2 at equal spaces. Further, the tips of the first terminals 4 are arranged in a straight line which is parallel to the edge 2*b*.

The second terminal 5 is formed into a rectangular shape larger than the width of the first terminal 4, and has a locking hole 50 which is locked in a housing 12 of the electric junction box 14. Furthermore, the second terminal 5 is connected to a fusible link 9.

The third terminal 6 is formed into a rectangular shape larger than the width of the first terminal 4, and has a locking hole 60 which is locked in the housing 12 of the electric junction box 14. Furthermore, the third terminal 6 is electrically connected to a relay 10 through a terminal tool 11. The terminal tool 11 electrically connects with a terminal 10*a* and the third terminal 6.

The second terminal 5 and the third terminal 6 respectively project from both ends of the main body 2 in the longitudinal direction X. That is, the second terminal 5 and the third terminal 6 are arranged so that the first terminals 4 are positioned between the second terminal 5 and the third terminal 6. Further, the second terminal 5 projects from the main body 2 longer than the first terminals 4, and the first terminals 4 project from the main body 2 longer than the third terminal 6. In addition, the tip of each first terminal 4 is positioned on the inside of a virtual straight line P connecting the tip of the second terminal 5 with the tip of the third terminal 6.

Such bus bar 1A is received in the housing 12 of the electric junction box 14 after the electric wire 7 is connected to the wire connection 3. Thereafter, the fuse 8, the fusible link 9 and the relay 10 are electrically connected. Further, the reference numeral 13 in FIG. 2 is an upper cover so as to cover the fuse 8, the fusible link 9 and the relay 10. The upper cover 13 is attached to the housing 12.

According to the present invention, when the bus bar of the present invention falls to the ground or hits against a wall before the bus bar 1A is received in the housing 12 of the electric junction box 14, the tip of the first terminal 4 can be prevented from hitting against a wall by the second terminal 5 and the third terminal 6. Further, the first terminal 4 can be protected by the second terminal 5 and the third terminal 6. Further, the second terminal 5 and the third terminal 6 are not only exclusive parts for protecting the first terminal 4 but also parts for electrically connecting the fusible link 9 and the relay 10. Therefore, the weight of the bus bar and material cost of the bus bar can be reduced although protective function of the first terminal is added to the bus bar 1A.

Furthermore, according to the present invention, the projection of the third terminal 6 is smaller than the projection of the first terminal 4 and the projection of the second terminal 5. That is. The length of the third terminal 6 is smaller than the length of the first terminal 4 and the length of the second terminal 5. Therefore, as shown in FIG. 2, an installing surface 12*a* of the relay 10 can be reduced. More specifically, distance from the edge 2*b* to the installing surface 12*a* can be short. Further, the size of the electric junction box 14 can be reduced.

[Second Embodiment]

Figure 3:
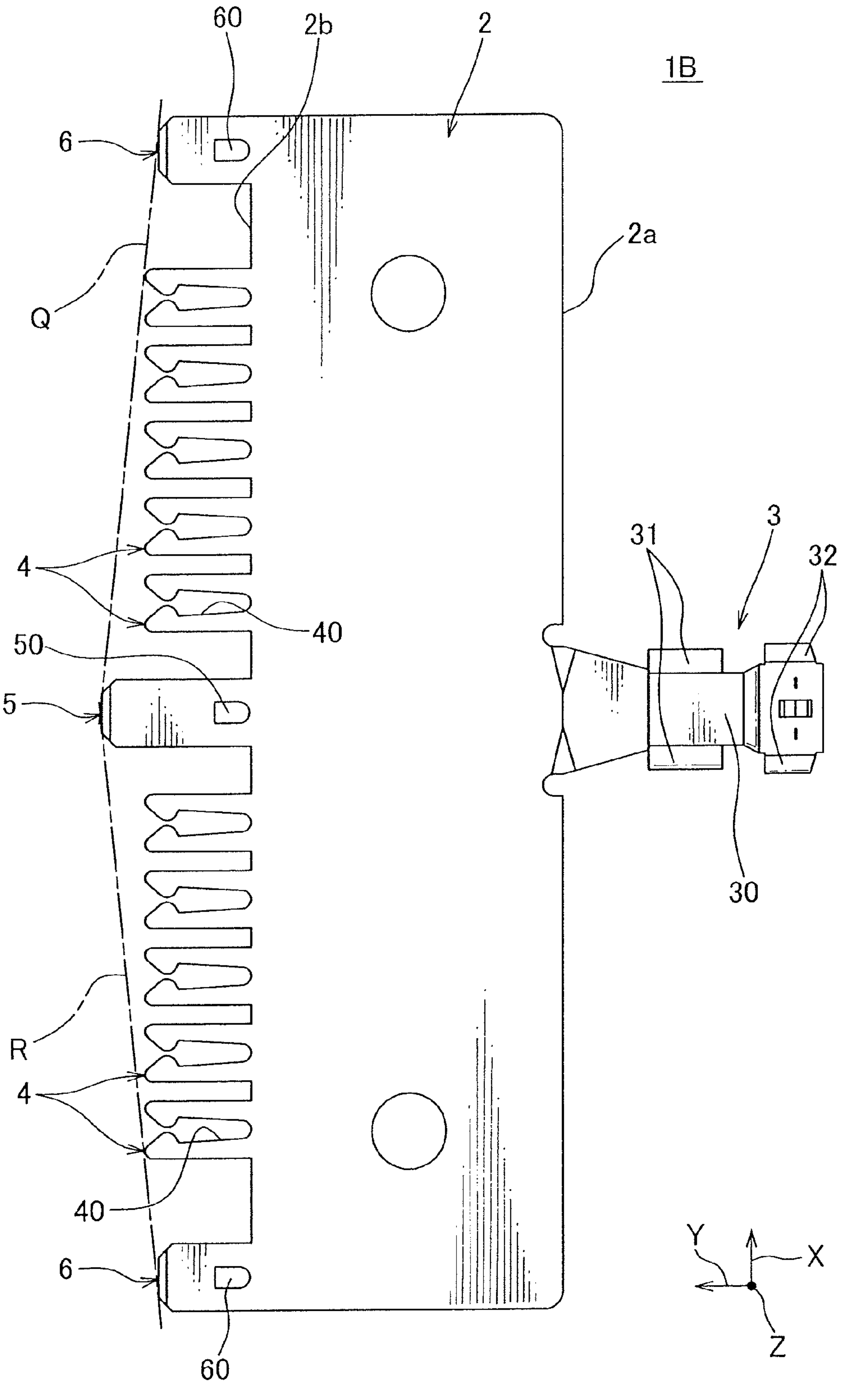
FIG. 3 is a plane view showing the bus bar in second embodiment of the present invention.

A bus bar according to second embodiment of the present invention will be explained with reference to FIG. 3. In FIG. 3, components already described with reference to the first embodiment are denoted by the same reference numerals, and thus detailed description thereof will be hereinafter omitted.

The bus bar 1B of the second embodiment of the present invention has the main body 2, the wire connection 3 projecting from the edge 2*a* of one side of the main body 2, a plurality of the first terminals 4 projecting from the edge 2*b* of the other side of the main body 2, the second terminal 5 projecting from the edge 2*b* of the other side of the main body 2 and a pair of the third terminals 6 projecting from the edge 2*b* of the other side of the main body 2.

The second terminal 5 projects from the center of the edge 2*b* of the main body 2 in the longitudinal direction X. The pair of the third terminals 6 project from both ends of the edge 2*b* of the main body 2 in the longitudinal direction X, respectively. More specifically, the second terminal 5 is positioned between the pair of the third terminals 6. Further, a plurality of the first terminals 4 are arranged between one of the third terminals 6 and the second terminal 5 and between the other third terminal 6 and the second terminal 5.

Furthermore, the second terminal 5 projects from the main body 2 longer than the first terminals 4, and the first terminals 4 project from the main body 2 longer than the pair of the third terminals 6. In addition, the tip of each first terminal 4 is positioned on the inside of virtual starlight lines Q, R connecting the tip of the second terminal 5 and the tip of each the third terminal 6.

According to the present invention, the tip of the first terminal 4 can be prevented from hitting object having a width smaller than space between the pair of the third terminals 6 before the bus bar 1B is received in the housing of the electric junction box.

[Third Embodiment]

Figure 4:
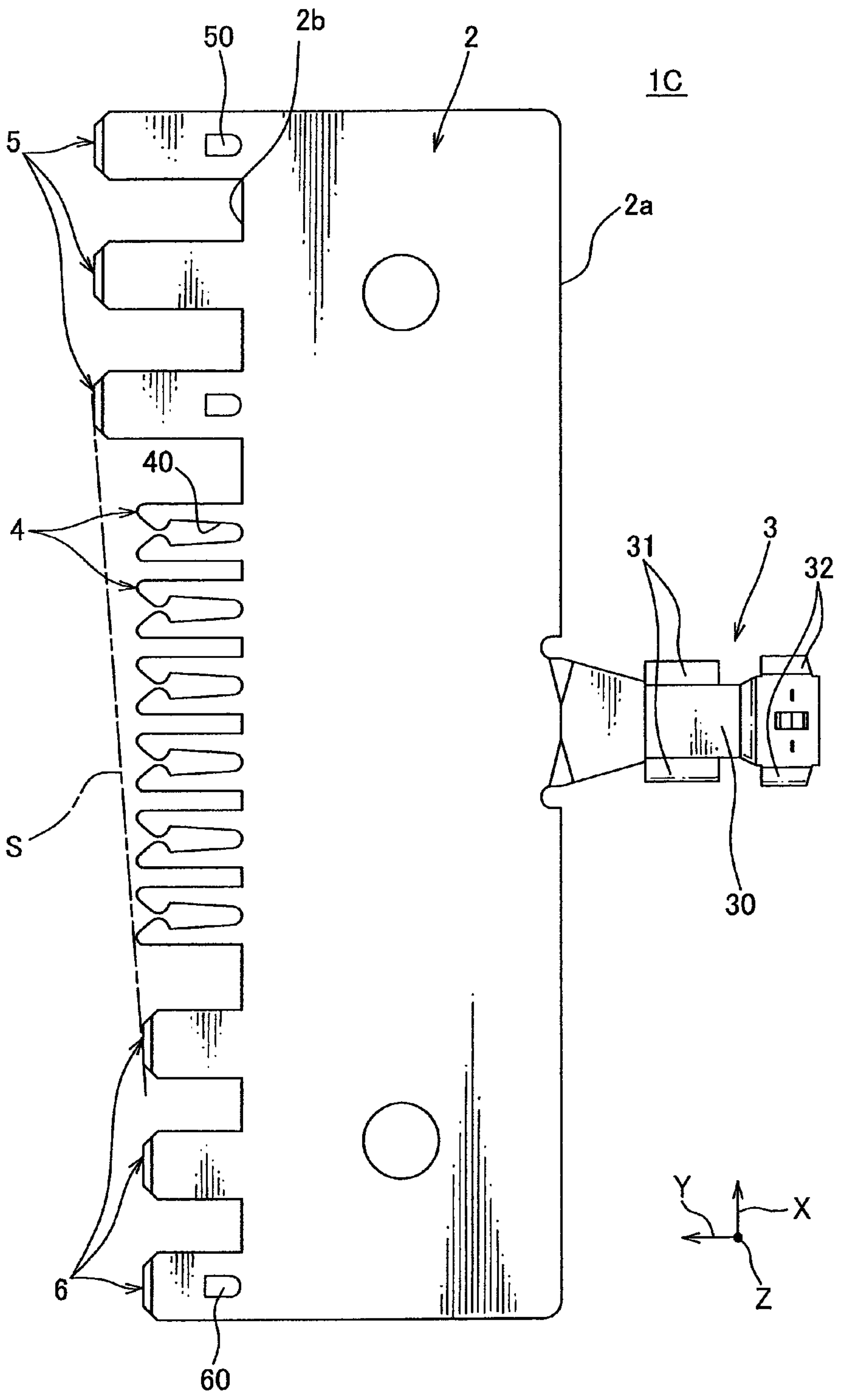
FIG. 4 is a plane view showing the bus bar in third embodiment of the present invention.

A bus bar according to third embodiment of the present invention will be explained with reference to FIG. 4. In FIG. 4, components already described with reference to the first embodiment are denoted by the same reference numerals, and thus detailed description thereof will be hereinafter omitted.

The bus bar 1C of the third embodiment of the present invention has the main body 2, the wire connection 3 projecting from the edge 2*a* of one side of the main body 2, a plurality of the first terminals 4 projecting from the edge 2*b* of the other side of the main body 2, a plurality of the second terminals 5 projecting from the edge 2*b* of the other side of the main body 2, and a plurality of the third terminals 6 projecting from the edge 2*b* of the other side of the main body 2.

Each second terminal 5 projects from one end of the edge 2*b* of the main body 2 in the longitudinal direction X. Each third terminal 6 projects from the other end of the edge 2*b* of the main body 2 in the longitudinal direction X. The first terminals 4 are arranged between the second terminals 5 and the third terminals 6.

Furthermore, the second terminals 5 projects from the main body 2 longer than the first terminals 4, and the first terminals 4 project form the main body 2 longer than the third terminals 6. In addition, the tip of each first terminal 4 is positioned on the inside of a virtual starlight line S connecting the tip of the second terminal 5 closest to the first terminal 4 and the tip of the third terminal 6 closest to the first terminal 4.

[Fourth Embodiment]

Figure 5:
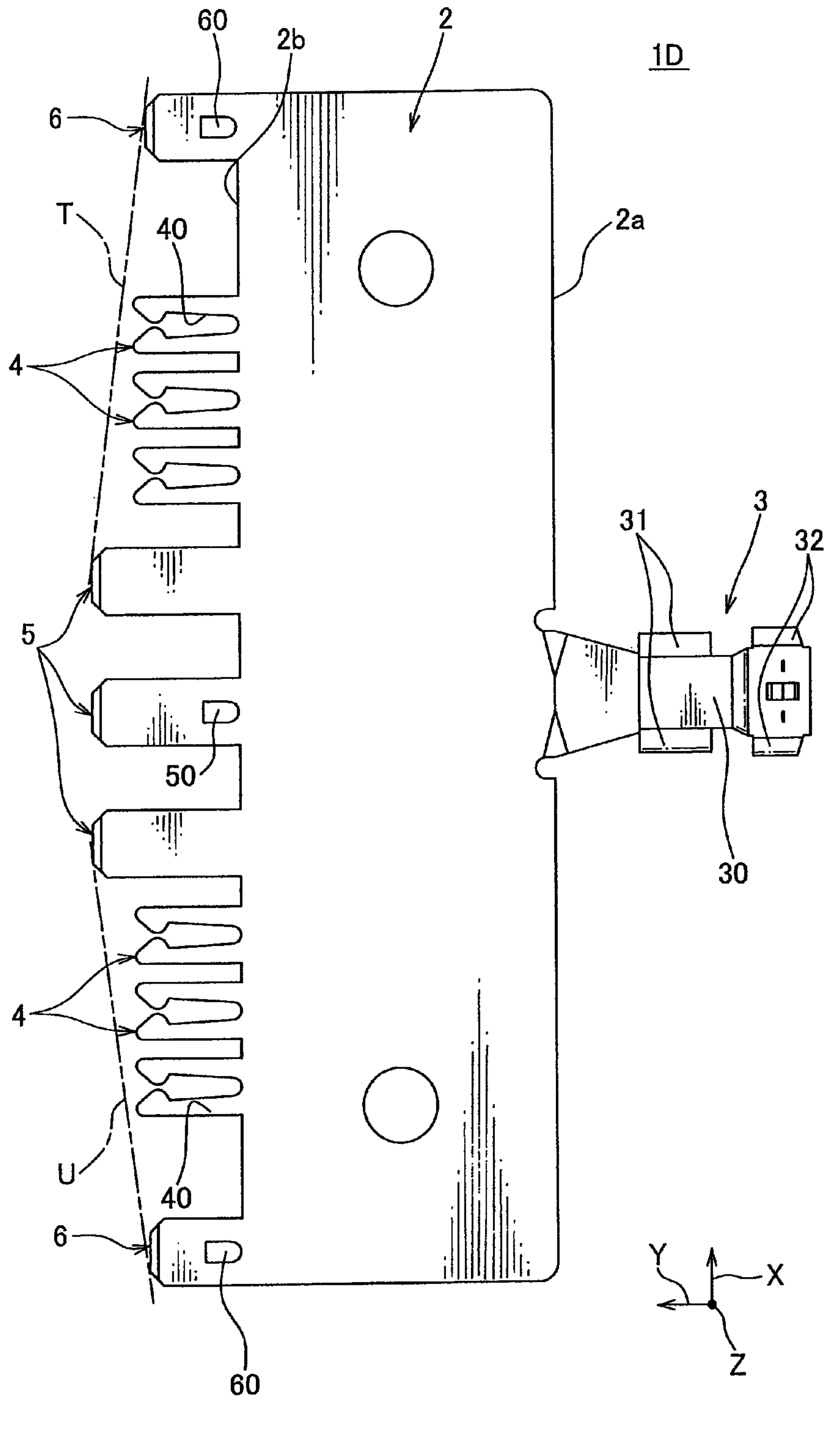
FIG. 5 is a plane view showing the bus bar in fourth embodiment of the present invention.
Figure 6:
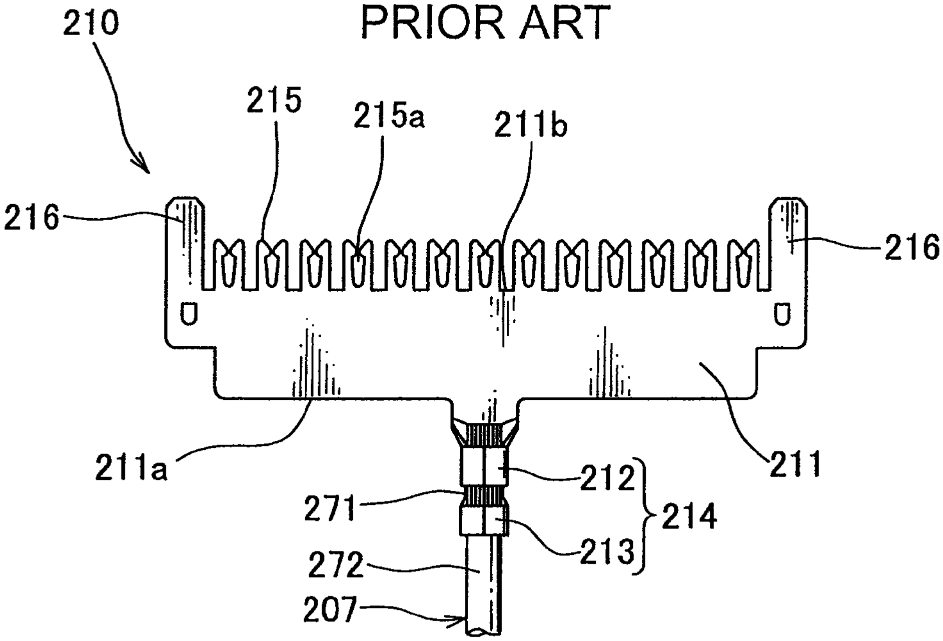
FIG. 6 PRIOR ART
FIG. 6 is a plane view showing a conventional bus bar.
Figure 7:
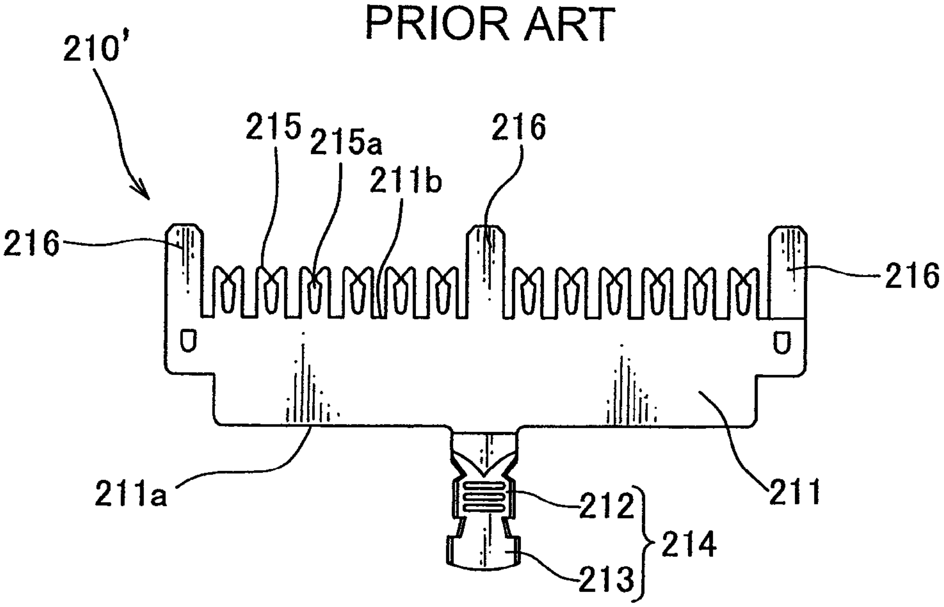
FIG. 7 PRIOR ART
FIG. 7 is a plane view showing the other conventional bus bar.

A bus bar according to fourth embodiment of the present invention will be explained with reference to FIG. 5. In FIG. 5, components already described with reference to the first embodiment are denoted by the same reference numerals, and thus detailed description thereof will be hereinafter omitted.

The bus bar 1D of the fourth embodiment of the present invention has the main body 2, the wire connection 3 projecting from the edge 2*a* of one side of the main body 2, a plurality of the first terminals 4 projecting from the edge 2*b* of the other side of the main body 2, a plurality of the second terminals 5 projecting from the edge 2*b* of the other side of the main body 2, and a pair of the third terminals 6 projecting from the edge 2*b* of the other side of the main body 2.

Each second terminal 5 projects from the center of the edge 2*b* of the main body 2 in the longitudinal direction X. The pair of the third terminals 6 project from both ends of the edge 2*b* of the main body 2 in the longitudinal direction X, respectively. More specifically, the second terminals 5 are positioned between the pair of the third terminals 6. Further, a plurality of the first terminals 4 are arranged between one of the third terminals 6 and one of the second terminals 5, and between the other third terminal 6 and the other second terminal 5.

Furthermore, the second terminals 5 project from the main body 2 longer than the first terminals 4, and the first terminals 4 project from the main body 2 longer than the pair of the third terminals 6. In addition, the tip of each first terminal 4 is positioned on the inside of virtual starlight lines T, U connecting the tip of the second terminal 5 closest to the first terminal 4 and the tip of each third terminal 6.

According to the embodiments described above, the second terminal 5 projects from the main body 2 longer than the first terminal 4, and the first terminal 4 projects from the main body 2 longer than the third terminal 6. However, it is not limited in the present invention. Namely, the third terminal 6 may project from the main body 2 longer than the first terminal 4, and the first terminal may project from the main body 2 longer than the second terminal 5.

While, an embodiment of the present invention is described, it will be understood that various change and modifications can be made without departing the scope of the present invention.

What is claimed is:

1. A bus bar formed by pressing a metallic plate comprising:
- a plate-shaped main body;
- a wire connection projecting from an edge of one end of the main body and connecting an electric wire by applying pressure;
- a tuning fork shaped first terminal projecting from a substantially middle edge of an opposite end of the main body and including a groove in which a terminal of electronic component is pressed;
- a bar-shaped second terminal projecting from a first substantially outer edge of the opposite end of the main body; and
- a bar-shaped third terminal projecting from a second substantially outer edge of the opposite end of the main body,
- wherein the first terminal is disposed between the second terminal and the second terminal,
- wherein one of the bar-shaped second terminal and the bar-shaped third terminal projects from the main body longer than the fork-shaped first terminal, and the other projects from the main body shorter than the first terminal, and
- wherein a tip of the first terminal is positioned lower than a virtual straight line from a tip of the second terminal to a tip of the third terminal.

2. The bus bar as claimed in claim 1, wherein a pair of the others of the second terminal and the third terminal are provided, and the one of the second terminal and the third terminal is arranged between the pair of the other,
- wherein the first terminals are respectively arranged between one of the pair of the others and the one of the second terminal and the third terminal, and between the other of the pair of the others and the one of the second terminal and the third terminal.

* * * * *